Oct. 30, 1951  T. F. MADSEN  2,573,210
FRUIT HARVESTER

Filed Jan. 21, 1949  2 SHEETS—SHEET 1

INVENTOR.
Thomas F. Madsen
BY
ATTYS

Oct. 30, 1951  T. F. MADSEN  2,573,210
FRUIT HARVESTER

Filed Jan. 21, 1949  2 SHEETS—SHEET 2

INVENTOR.
Thomas F. Madsen
BY
ATTYS

Patented Oct. 30, 1951

2,573,210

UNITED STATES PATENT OFFICE 2,573,210

FRUIT HARVESTER

Thomas F. Madsen, Planada, Calif., assignor to Planada Dehydrater Co., Planada, Calif., a partnership Application January 21, 1949, Serial No. 71,909

1 Claim. (Cl. 56—328)

This invention is directed to, and it is an object to provide, an improved fruit harvester; such harvester being of a type adapted to pick up fruit—especially figs—from the ground, and to thence convey such fruit to a predetermined point for discharge into a receiving container, such as a lug box.

Another object of the invention is to provide a fruit harvester which embodies a novel assembly of fruit pick-up units; each unit of such assembly comprising a vertically floatable ground engaging wheel having a relatively wide face from which a multiplicity of sharp pointed picks radiate for the purpose of impaling fruit onto the wheel for lifting, and subsequent stripping onto a conveyor.

A further object of the invention is to provide a fruit harvester, as in the preceding paragraph, which includes a novel mount for the assembly of pick-up units; such mount including mechanism by means of which all said units may be moved simultaneously to a raised, inactive position for transport of the machine from point to point.

An additional object of the invention is to provide a fruit harvester which is substantially automatic in operation; there being only a single worker required on the machine to attend to the placement, and removal, of the fruit receiving containers.

A still further object of the invention is to provide a fruit harvester which includes a mechanism operative to separate the picked-up fruit from clods, twigs, and leaves, whereby the fruit as discharged into the receiving containers is reasonably free of foreign material.

It is also an object of the invention to provide a fruit harvester which is designed for ease and economy of manufacture.

It is still a further object of the invention to provide a practical and relatively simple fruit harvester, and one which will be exceedingly effective for the purpose for which it is designed.

These objects are accomplished by means of such structure and relative arrangement of parts as will fully appear by a perusal of the following specification and claim.

In the drawings:

Fig. 3 is an enlarged fragmentary elevation of one of the pick-up units illustrating particularly the corresponding stripper unit.

Figure 1:
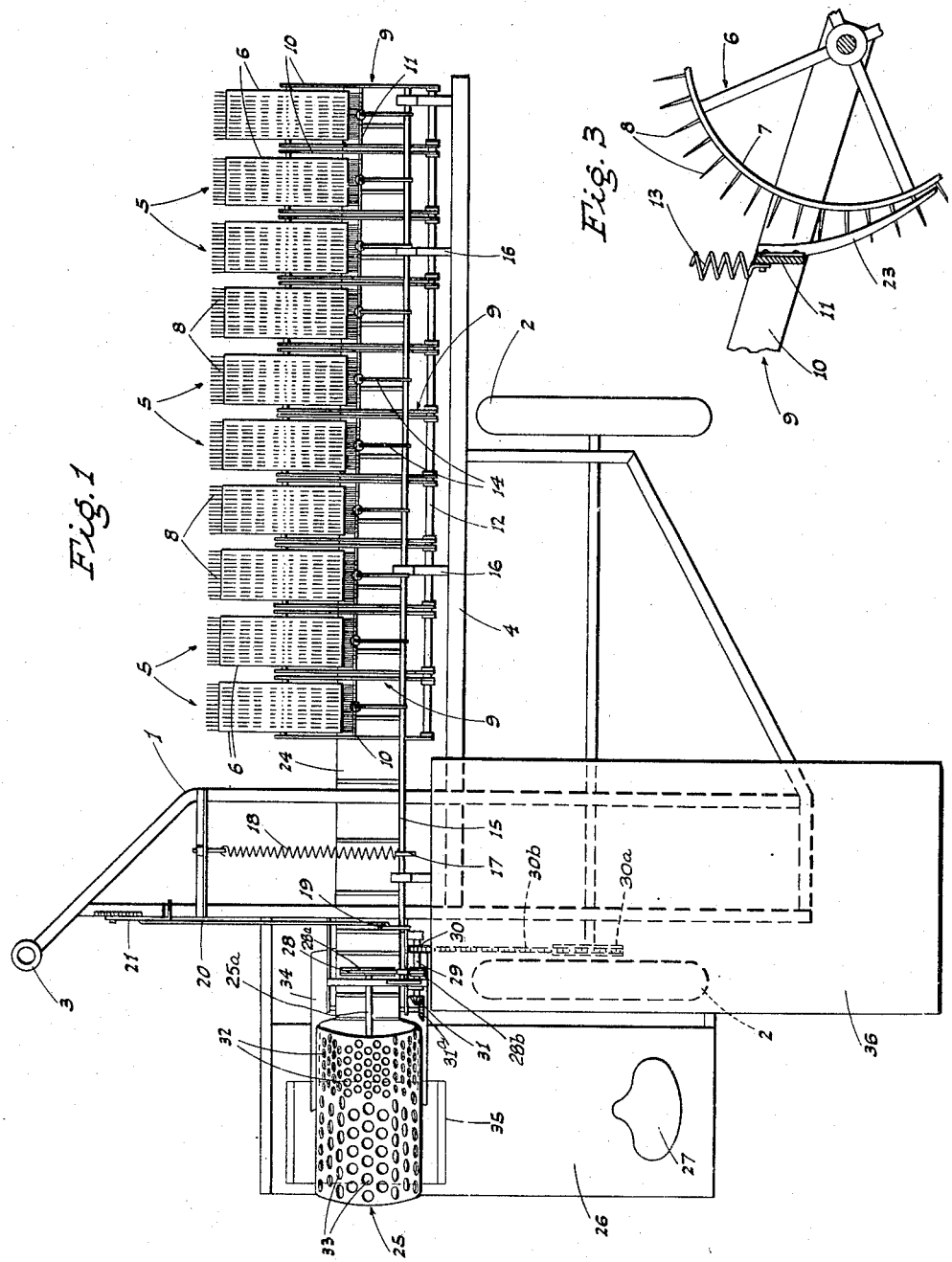
Fig. 1 is a plan view of the fruit harvester.
Figure 2:
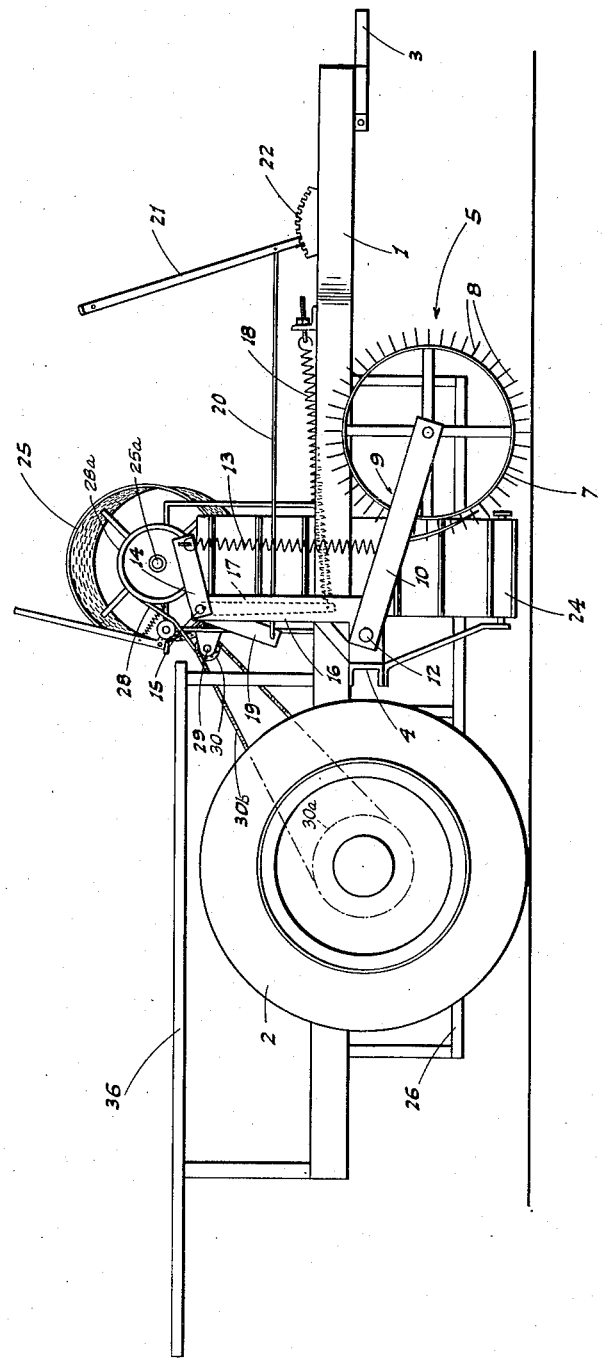
Fig. 2 is a side elevation of such harvester, taken from the end adjacent the assembly of fruit pick-up units.

Referring now more particularly to the characters of reference on the drawings, the fruit harvester comprises a main frame, indicated generally at 1, supported—for movement along the ground—by a pair of transversely spaced rear wheels 2. At the front end thereof the main frame 1 includes a draft tongue 3 adapted for connection to a pulling vehicle, such as a tractor.

Ahead of the wheels 2 the main frame 1 includes a relatively long, laterally projecting frame section 4, and ahead of said frame section there is disposed a plurality of side by side fruit pick-up units, indicated generally at 5. The fruit pick-up units 5 are disposed in alinement, transversely of the direction of travel, whereby to form a row; each such unit including a wheel 6 of substantial diameter, and which wheel includes a relatively wide flat face 7.

Each wheel 6 is fitted, at the periphery, with a multiplicity of radially projecting picks 8 which are sharp pointed, and which picks are arranged in circumferential, transversely spaced rows on the face 7 of the corresponding wheel.

The wheel 6 of each fruit pick-up unit 5 is mounted in a fork, indicated generally at 9, which includes rearwardly extending side arms 10 connected rearwardly of the wheel by a cross bar 11.

At their rear ends the forks 9 are journaled in common on a horizontal transverse shaft 12 supported from the frame section 4 ahead of the latter.

The forks 9 normally extend at a forward and downward incline from the shaft 12 whereby the pick-up units 5 are pushed forwardly upon advance of the harvester, yet tend to remain in ground contact so as to follow contour variations.

In order to reduce the ground pressure of the fruit pick-up units 5, each of the latter is counterbalanced by a vertical, upwardly extending tension spring 13 between the cross bar 11 of the corresponding fork 9, and a radial, normally stationary lever arm 14, which is fixed on, and projects from, a horizontal, transverse shaft 15 journaled in connection with the upper end of posts 16 which upstand from the frame section 4.

Adjacent its inner end the shaft 15 is fitted with a dependent radial lever arm 17, and a tension spring 18 connects between the lower end of lever arm 17 and an advanced point on the main frame 1.

Another radial lever arm 19 depends from the shaft 15 adjacent its inner end, and said lever arm 19 is pivotally connected to the rear end of a forwardly extending pull rod 20. At its forward end the pull rod 20 is pivotally connected to an upstanding hand lever 21 intermediate the ends of the latter; such hand lever being mounted on the main frame 1 for swinging motion in a longitudinal vertical plane, but is normally releasably latched against such motion by a latching mechanism which includes a notched quadrant 22. This arrangement normally holds the lever arms 14 stationary. However, upon release of the hand lever 21 and forward swinging motion thereof, the shaft 15 is rotated in a direction to swing the lever arms 14 upwardly, which results in lifting of the pick-up units 5 to a raised transport position clear of the ground. The spring 18 serves as a booster for such movement.

The cross bar 11 of each fork 9 includes a plurality of dependent stripper teeth 23 which project downwardly and slightly forwardly between the transversely spaced circumferential rows of picks 8; the lower ends of the stripper teeth 23 running closely adjacent the faces 7 of the wheels 6.

Upon advance of the implement along the ground in an orchard, which ground has previously been rolled smooth, and upon which the fruit has fallen, such fruit is impaled by the picks 8 as the wheels 6 of the fruit pick-up units 5 roll over such ground.

As so impaled the fruit, such as figs, rises with the back side of the wheels 6, but is soon stripped off said picks 8 by the stripper teeth 23. The fruit as stripped from the picks 8 falls downwardly onto an endless transverse conveyor 24, of cross cleated type, which is mounted in connection with the frame 1 ahead of the frame section 4; said conveyor 24 extending horizontally for the full length of the transverse row of pick-up units 5 and thence inclining upwardly for discharge into a rotary screen 25.

The rotary screen 25 is mounted laterally of the longitudinal median line of the frame 1 on the side opposite the assembly of fruit pick-up units 5; such rotary screen 25 having its axis transverse to the direction of travel, and inclined downwardly and outwardly.

The rotary screen 25 is mounted above a side platform 26 which is supported in connection with the main frame 1; there being an operator's seat 27 on such platform to the rear of the rotary screen 25. The shaft 25a of screen 25 is driven by a belt 28 which passes about a pulley 28a on said shaft 25a and another pulley 28b on a countershaft 29. This countershaft has a sprocket 30 thereon in line with a sprocket 30a fixed with the adjacent wheel 2; an endless chain 30b passing around the sprockets. Additionally, the endless conveyor 24 is driven from the countershaft 29 by means which includes meshing bevel pinions 31 and 31a.

The rotary screen 25 includes relatively small holes 32 through the inner end portion thereof, and relatively large holes 33 in the outer portion thereof.

The fruit which is fed into the rotary screen 25 by the conveyor 24 tumbles in the rotary screen 25; dirt and like debris passing through the small holes 32 and being deflected onto the ground by a debris plate or chute 34. The fruit finds its way through the relatively larger holes 33 and falls into a lug box 35 on the platform 26 below the rotary screen 25. Twigs and leaves pass entirely through the rotary screen 25 and discharge onto the ground.

Rearwardly of the shaft 15 the main frame 1 is fitted with a horizontal elevated platform 36 upon which a supply of lug boxes is carried when the harvester is in operation; such lug boxes being readily manually accessible to the person who occupies the seat 27 and who attends to the placement of the lug boxes 35 beneath the rotary screen 25 for filling with fruit.

The described fruit harvester functions smoothly and effectively for the recovery of semi-hard or firm fruit, such as figs, from the ground; the operation of the harvester being mainly automatic, requiring only a single person to attend to the placement and removal of the lug boxes as filled one at a time from the rotary screen 25.

The design of the harvester is such that it may be manufactured readily and economically, and said harvester requires a minimum of maintenance or repair.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A fruit harvester comprising a frame supported for movement along the ground, a plurality of separate rotary fruit pick-up units disposed in a row transversely of the harvester, a transverse shaft mounted on the frame in spaced relation to the pick-up units lengthwise of the harvester, supporting means for each unit comprising a longitudinally extending fork turnably swung on the shaft and having arms straddling said unit, another transverse shaft mounted above the first named shaft, arms rigid with and projecting from the last named shaft in overhanging relation to the different forks, individual tension springs between said rigid arms and the forks and floatably supporting the latter; and means operatively associated with said last named shaft to adjustably rotate the last named shaft and hold the same in any position of adjustment.

THOMAS F. MADSEN.

REFERENCES CITED

The following references are of record in the file of this patent:

UNITED STATES PATENTS

| Number | Name | Date |
|---|---|---|
| 1,059,063 | Morton | Apr. 15, 1913 |
| 1,808,928 | Lint | June 9, 1931 |
| 2,065,169 | Carpenter | Dec. 22, 1936 |
| 2,155,543 | Grignolo | Apr. 25, 1939 |
| 2,267,303 | Jordan | Dec. 23, 1941 |
| 2,316,986 | Parker | Apr. 20, 1943 |
| 2,402,201 | Martin | June 18, 1946 |
| 2,429,743 | Bingham et al. | Oct. 28, 1947 |
| 2,517,413 | Pearson | Aug. 1, 1950 |

FOREIGN PATENTS

| Number | Country | Date |
|---|---|---|
| 13,314 | Great Britain | June 15, 1903 |